United States Patent [19]

Dorai

[11] Patent Number: 5,852,218
[45] Date of Patent: Dec. 22, 1998

[54] ALKANOLYSIS OF POLYETHER POLYOL ESTERS BY REACTIVE DISTILLATION

[75] Inventor: Suriyanarayan Dorai, Missouri City, Tex.

[73] Assignee: E. I. du Pont de Nemours and Company, Wilmington, Del.

[21] Appl. No.: 572,556

[22] Filed: Dec. 14, 1995

[51] Int. Cl.$^6$ .................................................. C07C 41/04
[52] U.S. Cl. ............................ 568/621; 568/617; 203/91
[58] Field of Search ............................. 203/91; 568/621, 568/617; 560/240

[56] References Cited

U.S. PATENT DOCUMENTS

| | | | |
|---|---|---|---|
| 4,163,115 | 7/1979 | Heinsohn et al. | 560/240 |
| 4,230,892 | 10/1980 | Pruckmayr | 568/617 |
| 4,510,333 | 4/1985 | Pruckmayr | 568/617 |
| 4,584,414 | 4/1986 | Pruckmayr | 568/617 |
| 5,282,929 | 2/1994 | Dorai et al. | 203/91 |
| 5,321,181 | 6/1994 | Smith et al. | 585/467 |

FOREIGN PATENT DOCUMENTS 5-194723  8/1993  Japan .

*Primary Examiner*—Gary Geist
*Assistant Examiner*—Sreeni Padmanabhan

[57] ABSTRACT

A method for converting the diester of a polyether polyol (e.g., the diacetate ester of polytetramethylene ether, PTMEA) to a corresponding dihydroxy polyether polyol (e.g., polytetramethylene ether glycol, PTMEG) involving reactive distillation wherein a diester of polyether polyol is fed to the top portion of the column along with an effective amount of at least one alkali metal oxide or alkaline earth metal oxide, hydroxide or alkoxide catalyst (e.g., sodium methoxide) and with a $C_1$ to $C_4$ alkanol (e.g., methanol) while simultaneously adding to the bottom of the reactive distillation column hot alkanol vapor to sweep any alkanol ester formed by alkanolysis of the diester of polyether polyol upwardly. Such a process is useful for achieving high levels of conversion PTMEA to PTMEG on a commercial scale with the overhead from the column being amenable to azeotropic separation of the methyl acetate and recycle of the methanol.

8 Claims, 1 Drawing Sheet

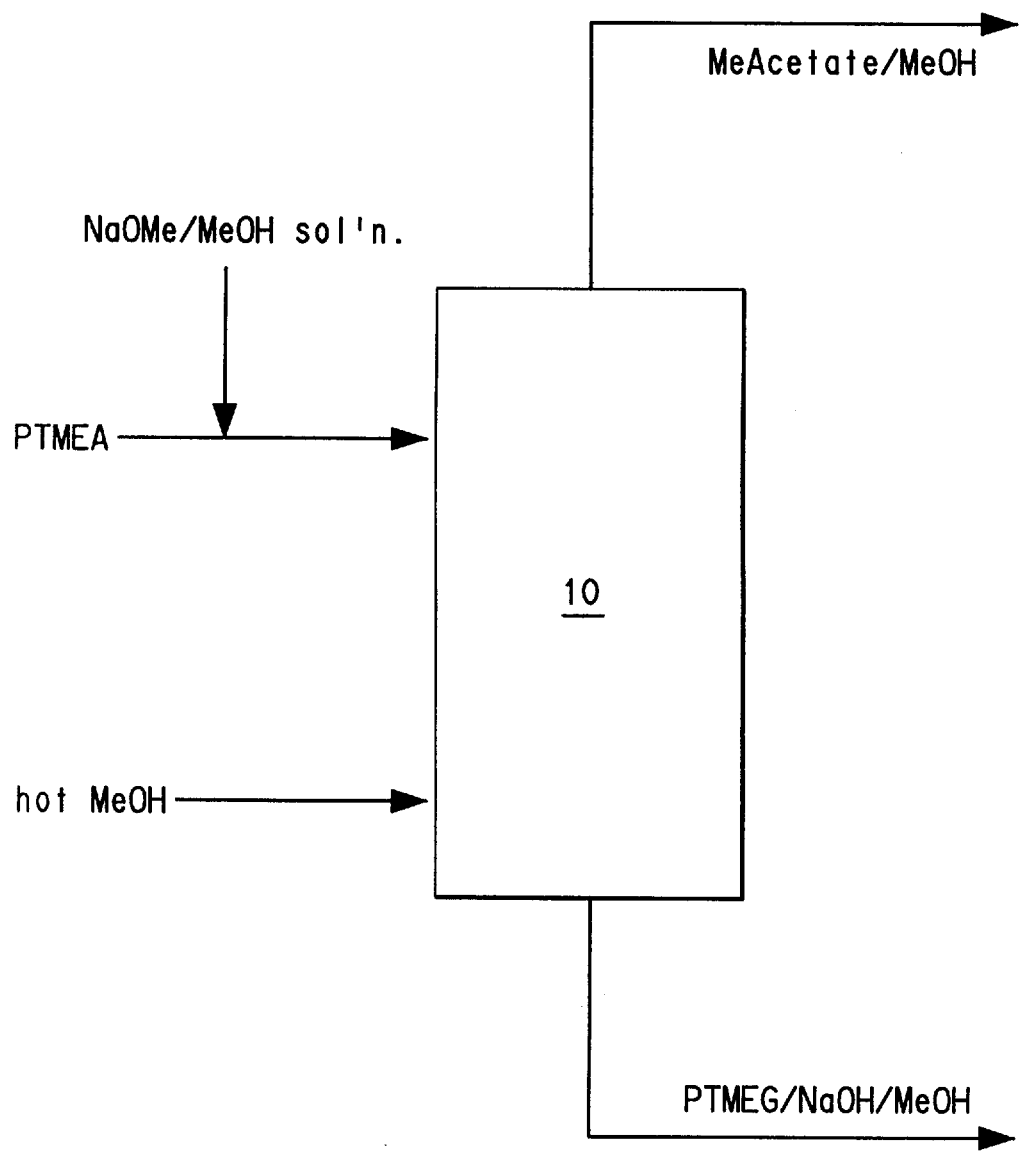
FIGURE

ALKANOLYSIS OF POLYETHER POLYOL ESTERS BY REACTIVE DISTILLATION

BACKGROUND OF THE INVENTION

1. Field of the invention

The present invention relates to the alkanolysis of polyether polyol esters to polyether polyols using reactive distillation. More specifically but not by way of limitation, the invention relates to the methanolysis of polytetramethylene ether diacetate to polytetramethylene ether glycol by reactive distillation with methanol and sodium methoxide.

2. Description of the Related Art

Polytetramethylene ether glycol (PTMEG) is a commodity in the chemical industry which is widely used to form segmented copolymers with poly-functional urethanes and polyesters.

It is well known that in the preparation of polyether polyols, generally, and specifically the polymerization of THF and/or THF with comonomers in which acetic acid and acetic anhydride are used the intermediate products will contain acetate or other end groups which must be subsequently converted to the hydroxyl functionality prior to ultimate use. For example, U.S. Pat. No. 4,163,115 discloses the polymerization of THF and/or THF with comonomers to polytetramethylene ether diester using a fluorinated resin catalyst containing sulfonic acid groups, in which the molecular weight is regulated by addition of an acylium ion precursor to the reaction medium. The patent discloses the use of acetic anhydride and acetic acid in combination with the solid acid catalyst. The polymeric product is isolated by stripping off the unreacted THF and acetic acid/acetic anhydride for recycle. The product isolated is the diacetate of polymerized tetrahydrofuran (PTMEA) which must be converted to the corresponding dihydroxy product, polytetramethylene ether glycol (PTMEG), to find application as a raw material in most urethane end use applications. Consequently, the ester end-capped polytetramethylene ether is reacted with a basic catalyst and an alkanol such as methanol to provide the final product polytetramethylene ether glycol and methyl acetate as a by-product.

U.S. Pat. Nos. 4,230,892 and 4,584,414 disclose processes for the conversion of PTMEA to PTMEG comprising mixing a polytetramethylene ether diester with an alkanol of 1 to 4 carbons, and a catalyst which is an oxide, hydroxide, or alkoxide of an alkaline earth metal and an alkali metal hydroxide or alkoxide, respectively, bringing the mixture to its boiling point and holding it there while the vapors of the alkanol/alkyl ester azeotrope which form are continuously removed from the reaction zone, until conversion is essentially complete; and then removing the catalyst. Using CaO at 50 degree Celsius showed incomplete conversions when methanolysis was carried out in 4 staged continuously stirred reactors. Also, high catalyst levels were necessary, and the process was not energy efficient because of the high heat input required to vaporize methanol in the 4 staged reactors. Above all the finished product PTMEG contained small amounts of unreacted PTMEA, which is not a desirable component in urethane reactions.

SUMMARY OF THE INVENTION

In view of the problems associated with previously suggested methods of converting PTMEA to PTMEG, the present invention provides an improved method of achieving virtually complete conversion and recovery of PTMEG free of unreacted/unconverted PTMEA and alkanol ester by-product. Thus the present invention provides a method for converting the diester of a polyether polyol to a corresponding dihydroxy polyether polyol comprising the steps of:

(a) feeding to the upper portion of a distillation column at least one diester of polyether polyol and an effective amount of at least one alkali metal or alkaline earth metal oxide, hydroxide or alkoxide catalyst and with a $C_1$ to $C_4$ alkanol to convert the diester of polyether polyol to dihydroxy polyether polyol;

(b) adding to the lower portion of the distillation column hot alkanol vapor to sweep any alkanol ester formed by alkanolysis of the diester of polyether polyol upwardly in the distillation column;

(c) recovering overhead of the distillation column alkanol and alkanol ester formed by alkanolysis; and (d) recovering from the bottom of the distillation column dihydroxy polyether polyol free of alkanol ester formed by alkanolysis.

In one embodiment of the invention the overhead from the distillation column is subjected to further separation and recovery of unreacted alkanol from the alkanol ester; and the alkanol produced in the separation is recycled to the distillation column. In one preferred embodiment of the invention the diester of polyether polyol is the diacetate ester of polytetramethylene ether, PTMEA, and the catalyst is sodium methoxide and the alkanol is methanol, thus recovering polytetramethylene ether glycol, PTMEG, free of methyl acetate. In this preferred embodiment according to the present invention the overhead from the reactive distillation column, containing unreacted methanol and the methyl acetate ester by-product, is further subjected to azeotropic separation of the methyl acetate and subsequent recycle of the methanol having less than 500 ppm and most preferably less than 100 ppm methyl acetate to the distillation column.

It is an object of the present invention to provide an improved method for the alkanolysis of polyether polyol esters to produce polyether polyol using reactive distillation such as to drive the reaction to completion. It is a further object to effect simultaneously within the reactive distillation column substantially complete separation of by-product alkanol ester from polyether polyol thus producing product of high purity. It is a further object of the present invention to provide for subsequent separation of the overhead stream from the reactive distillation column such as to provide for recycle of the alkanol. Fulfillment of these objects and the presence and fulfillment of additional objects will become apparent upon complete reading of the specification including claims and attached drawing.

BRIEF DESCRIPTION OF THE DRAWING

The Figure is a schematic representation of one particular embodiment of the reactive distillation according to the present invention illustrating a continuous process for the removal of methyl acetate during the methanolysis of polytetramethylene ether acetate and subsequent recovery of purified polytetramethylene ether glycol.

DESCRIPTION OF THE PREFERRED EMBODIMENTS

Tetrahydrofuran (THF) can be polymerized using solid acid resin catalyst and acetic acid/acetic anhydride as molecular weight moderators as described in U.S. Pat. No. 4,163,115, the teachings of which are incorporated herein by reference. Typically the THF conversions to polymer range from about 20 to 40% at temperatures of about 40° to 50° C. The polymeric product is preferably isolated by stripping off the unreacted THF and acetic acid/acetic anhydride for recycle. The product so isolated is the polymerized diacetate of tetrahydrofuran (PTMEA), which must be converted to the dihydroxy product polytetramethylene ether glycol (PTMEG) to find application as a raw material in most urethane end use applications.

The polyether polyol diester compositions of the present invention are generally any polyether such as polyethers typically produced via an acid catalyzed ring opening polymerization reaction of a cyclic ether or mixture in the presence of a carboxylic acid and carboxylic acid anhydride wherein tetrahydrofuran is the major and/or dominant reactant; i.e., substantial THF being incorporated into the PTMEA product. More specifically, the polyether diesters are derived from the polymerization of tetrahydrofuran (THF) with or without an alkyl substituted tetrahydrofuran comonomer, preferably for example 3-methyl tetrahydrofuran (3-MeTHF), as well as the copolymerization of THF (again with or without 3-MeTHF) and with an alkylene oxide such as ethylene oxide or propylene oxide or equivalent comonomer. As such, the following description and examples will predominantly refer to THF with the understand that the other comonomers may optionally be present.

Typically the products of the initial polymerization process are in the form of acetates (or similar terminal ester groups) which are converted to the hydroxyl group terminated glycols by reacting them with methanol in the presence of transesterification/alkanolysis catalysts. This reaction requires a catalyst to attain reasonable rates. Common methanolysis catalysts useful in the present invention include sodium methoxide (NaOMe), sodium hydroxide (NaOH), and calcium oxide. In principle the catalyst useful for reactive distillation purposes is any highly alkaline alkanolysis catalyst generally categorized as an alkali metal or alkaline earth metal oxide, hydroxide or alkoxide catalyst and mixtures thereof as taught in U.S. Pat. Nos. 4,230,892 and 4,584,414 (here incorporated by reference for such purpose). Particularly useful are alkanolysis catalyst that inherently have some water scavenging capability without loss of catalyst activity (e.g., NaOH/NaOMe/$Na_2O$ system wherein trace water is converted to the catalytically active NaOH). The reaction rate using NaOH/NaOMe is rapid even at room temperature and therefore methanolysis is carried out at atmospheric pressures. The by-product in this methanolysis is methyl acetate which forms a lower boiling azeotrope with methanol. The alkanolysis reaction is reversible and therefore continuous removal of volatile methyl acetate/methanol azeotrope is essential to obtain a conversion approaching 100%. In the present invention, this is done in a reactive distillation column wherein methanol vapor is fed into the column bottom to strip the polymer of methyl acetate. By stripping methyl acetate in this manner, greater than 99.99% conversion is achieved in the column. In contrast at least 5 sequential continuously stirred reactor stages are required to achieve complete conversion.

In the present invention, complete conversions of PTMEA to PTMEG are achieved in a single reactive distillation column (RXDC) using counter-current flow. More specifically when employing methanol as the alcohol reactant in the alkanolysis reaction, a RXDC operating at 65–70 degree Celsius and 0–5 psig has been found to be the most cost-effective and energy-efficient method of achieving complete conversion of PTMEA to good quality PTMEG. Conventional use of series of continuously stirred reactors (CSTR's) is several times more capital intensive and uses several times the amount of methanol to achieve an equivalent degree of conversion to PTMEG.

The reactive distillation according to the present invention, how it is performed and how it differs from the previously suggested methods can perhaps be best explained and understood by reference to the attached drawing. As illustrated in the Figure, a single distillation column 10 is preferably employed in a continuous manner. This reactive distillation can be performed by any of the distillation methods and equipment as generally known and practiced in the art. For example but not by way of limitation, a deep seal sieve tray distillation column was tested. However, it is felt that a conventional tray distillation column would have been equally effective. Preferably and as illustrated in the Figure and as employed in the Examples below, the methanolysis is performed by feeding the polyether polyol ester, (in this specific embodiment illustrated in the Figure PTMEA) substantially free of unpolymerized THF and acetic anhydride/acetic acid (ACAN/HOAc), to or near the top of the column 10. The methanolysis catalyst (a solution of NaOMe dissolved in MeOH in the illustrated embodiment) is also fed to the column 10, either mixed with the polyether polyol ester (PTMEA) prior to entering the column, or at a point near the feed point for the polyether polyol ester. Vaporized methanol (hot MeOH) is fed near the column 10 bottom so that it contacts the unreacted PTMEA containing the least amount of free acetic acid in the presence of NaOMe/NaOH catalyst to drive the equilibrium to complete conversion. The overheads from RXDC is a mixture of methanol and methyl acetate. These overheads may be routed to an azeotrope distillation column to azeotropically recover the methanol (not shown). PTMEG and MeOH are drawn off the RXDC column 10 bottoms. The excess MeOH may be removed in a methanol stripper operating under at a reduced pressure between about 100 and 450 mm Hg, and at a temperature of about 125° to 145° C. The resulting PTMEG stream is then essentially free of MeOH, and contains unreacted transesterification catalyst, NaOMe. Preferably the NaOMe is removed as described in U.S. Pat. No. 5,410,093, the teachings of which are herein incorporated by reference.

In view of the above description of the specific embodiment illustrated in the drawing, it should be appreciated that the reactive distillation column can be considered for purposes of this invention as involving stripping as a key or critical necessary feature (in contrast to rectification). In other words, the ascending hot alkanol vapor reactant introduced at or near the bottom of the distillation column and the consequential reactive stripping of the alkanol ester formed in the alkanolysis/transesterification reaction is a paramount consideration in achieving the desired total conversion of polyether polyol to the corresponding dihydroxy polyether polyol. For all practical purposes the recovery of purified distillate and hence the concept of reflux and/or rectification can be performed advantageously in a separate column (e.g., witness the use of the separate azeotropic distillation in the case of methyl acetate formation). Of course this does not mean that the distillation and recovery of purified distillate overhead in a single column can not be employed but rather the instant invention affords the opportunity to separate the reactive stripping from the recovery and recycle of unreacted alcohol. In fact, this affords also the opportunity to achieving separation and recovery of the overhead stream components by techniques other than distillation.

Mathematical modeling indicates that the methyl acetate concentration in the hot methanol stream fed to the bottom of the RXDC should be less than 100 ppm in order to achieve a conversion of 99.999% in the RXDC. Control of the methyl acetate concentration in the bottom methanol stream of the azeotrope column (again not shown in the drawing) to a level less than 500 ppm and most preferably to a level less than 100 ppm has been achieved. The azeotrope distillation column bottom should be operated at temperatures greater than 66 degree Celsius to ensure a methyl acetate concentration of less than 100 ppm. Higher concentrations of methyl acetate tends to have an adverse effect on the conversion of PTMEA to PTMEG in the reactive distillation column.

The alkanolysis method according to the present invention is robust and results in complete conversion of PTMEA to PTMEG. The amount of catalyst required for the continuous RXDC process is about 200 to 1000 ppm based on PTMEA, and is preferably 500 to 700 ppm. Similar amounts fail to produce comparable yields in a batch process.

The amount of make-up methanol needed during continuous operation with methanol recycle (both azeotropic recovery of overhead and stripping from PTMEG product) is in principle equal to the stoichiometric amount of PTMEA in the feed to the reactive distillation column (i.e., two moles of methanol consumed for each mole of PTMEG formed) plus a corresponding amount consumed in the distillation of the (85%) methyl acetate azeotrope creating part of the recycle methanol (i.e., the amount of free methanol in the co-product azeotrope). Commercially available methanol feed to be used as make-up to the reactive distillation column typically has less than 500 ppm water, and preferably contains less than 200 ppm. This small amount of water is not detrimental to the process. In fact small amounts of water convert sodium methoxide to sodium hydroxide which is as effective a catalyst as sodium methoxide. Thus the use of sodium methoxide obviously is advantageous because of this ability to consume trace amounts of water in the process without loss of catalytic activity. However, a large amount of water in the system is extremely detrimental as water slowly hydrolyzes PTMEA to produce PTMEG and free acetic acid. Acetic acid produced in this manner neutralizes the catalyst and this can drive the conversion to <50%.

Typically, about 50–120 ppm free acetic acid in the PTMEA feed did not adversely affect the methanolysis. Higher concentrations of acetic acid in the feed will drive the catalyst requirement higher as free acetic acid reacts with sodium methoxide to produce a sodium acetate which has no catalytic activity.

The presence of unpolymerized THF in PTMEA has virtually no effect on operability of this process or product quality. Free THF ends up in the overheads of the reactive distillation column. No build-up of THF was indicated during continuos operation of this process.

EXAMPLE

In order to demonstrate the operation of a continuous reactive distillation process according to the present invention, a single RXDC unit having a nominal capacity of about 100 pounds per hour of diacetate of PTMEG, referred to as PTMEA, was constructed and operated consistent with that shown in the Figure. The unit was designed to demonstrate the reactive distillation column in combination with an azeo column unit operations for separating and recycling methanol. A mixture containing 99.8% MeOH and 0.2% NaOMe was mixed with PTMEA at 75° C. in a ratio of 3:1 by volume and was fed to the top of the deep-seal reactive distillation column while methanol vapor was added to the column bottom at 83° C. The column overheads were condensed at 40° C., and contained approximately 79.6% MeOH and 20.4% MeAcetate. This stripped methyl acetate along with methanol was sent to an azeotrope column. The column bottoms contained the product PTMEG and 26.2% MeOH and 700 ppm unreacted NaOMe on a methanol-free basis. The conversion to PTMEG was in excess of 99.99 wt %.

The advantages and benefits of the improved process according to the present invention are felt to be numerous and significant. For example, relative to the historical use of methanolysis to convert PTMEA to PTMEG, the reactive distillation of the instant process produces a methyl acetate free product stream with virtually no PTMEA residue and at essentially complete conversion to PTMEG. The present invention further provides an advantage in term of the economy of using a single stage or distillation column to achieve total conversion with a savings in terms of both capital and energy requirements. The instant process exhibits an advantage in providing for reuse of methanol containing less than 100 ppm methyl acetate and thus ensures virtually total conversion at the bottom of the reactive distillation column.

Having thus descried and exemplified the invention with a certain degree of particularity, it should be appreciated that the following claims are not to be so limited but are to be afforded a scope commensurate with the wording of each element of the claim and equivalents thereof.

We claim:

1. A method for converting the diester of a polyether polyol to a corresponding dihydroxy polyether polyol comprising the steps of:

(a) feeding to the upper portion of a distillation column at least one diester of polyether polyol and an effective amount of at least one alkali metal or alkaline earth metal oxide, hydroxide or alkoxide catalyst and with a $C_1$ to $C_4$ alkanol to convert said diester of polyether polyol to dihydroxy polyether polyol;

(b) adding to the lower portion of said distillation column hot alkanol vapor to sweep any alkanol ester formed by alkanolysis of said diester of polyether polyol upwardly in said distillation column;

(c) recovering overhead of said distillation column alkanol and alkanol ester formed by alkanolysis; and (d) recovering from the bottom of said distillation column dihydroxy polyether polyol free of alkanol ester formed by alkanolysis at a conversion rate of PTMEA to PTMEG in excess of 99.99%.

2. A method of claim 1 further comprising the steps of:

(a) subjecting the overhead from the distillation column to further separation and recovery of unreacted alkanol from the alkanol ester; and (b) recycling the alkanol produced in the separation to the distillation column.

3. A method of claim 1 wherein said diester of polyether polyol is the diacetate ester of polytetramethylene ether and said catalyst is sodium methoxide and said alkanol is methanol, thus recovering polytetramethylene ether glycol free of methyl acetate.

4. A method of claim 1 wherein said diester of polyether polyol is the diacetate ester copolymer of tetrahydrofuran and 3-methyl tetrahydrofuran, and said catalyst is sodium methoxide and said alkanol is methanol, thus recovering copolymer ether glycol free of methyl acetate.

5. A method of claim 3 further comprising the steps of:
(a) subjecting the overhead from the distillation column to azeotropic separation and recovery of unreacted methanol from methyl acetate; and
(b) recycling the methanol produced in the azeotropic separation having less than 500 ppm methyl acetate to the distillation column.

6. A method of claim 5 wherein said methanol produced in the azeotropic separation and recycled to the distillation column contains less than 100 ppm methyl acetate.

7. A method of claim 4 further comprising the steps of:
(a) subjecting the overhead from the distillation column to azeotropic separation and recovery of unreacted methanol from methyl acetate; and
(b) recycling the methanol produced in the azeotropic separation having less than 500 ppm methyl acetate to the distillation column.

8. A method of claim 7 wherein said methanol produced in the azeotropic separation and recycled to the distillation column contains less than 100 ppm methyl acetate.

* * * * *